United States Patent [19]

Behle

[11] 4,206,708

[45] Jun. 10, 1980

[54] TRANSPORTER WITH PALLET CARS COUPLED WITH EACH OTHER FOR ESCALATORS

[75] Inventor: Fritz Behle, Hattingen, Fed. Rep. of Germany

[73] Assignee: O & K Orenstein & Koppel Aktiengesellschaft, Berlin, Fed. Rep. of Germany

[21] Appl. No.: 896,313

[22] Filed: Apr. 14, 1978

[30] Foreign Application Priority Data

Apr. 23, 1977 [DE] Fed. Rep. of Germany ....... 2718169

[51] Int. Cl.2 ...................... B65G 17/06; B65G 17/46; B61B 13/12

[52] U.S. Cl. .................................. 104/172 B; 104/25; 104/165; 198/321; 198/575; 198/732

[58] Field of Search ..................... 104/25, 147 R, 162, 104/165, 172 R, 172 B, 172 BT; 198/321, 326, 570, 698, 732, 575

[56] References Cited

U.S. PATENT DOCUMENTS

| | | | |
|---|---|---|---|
| 3,096,725 | 7/1963 | Widmer | 198/321 X |
| 3,298,495 | 1/1967 | Acton | 198/321 |
| 3,351,177 | 11/1967 | Mulligan | 198/570 X |
| 3,694,999 | 10/1972 | Switliski et al. | 198/732 X |
| 3,918,367 | 11/1975 | Alimanestiand et al. | 104/172 R X |
| 3,973,668 | 8/1976 | Stansfield | 198/698 X |

FOREIGN PATENT DOCUMENTS

| | | | |
|---|---|---|---|
| 176505 | 10/1953 | Austria | 198/732 |
| 626456 | 4/1963 | Belgium | 198/321 |
| 1269228 | 7/1961 | France | 198/321 |
| 567135 | 10/1957 | Italy | 198/321 |

*Primary Examiner*—Randolph A. Reese

*Attorney, Agent, or Firm*—Martin A. Farber

[57] ABSTRACT

A transportation system includes pallet cars coupled with one another; the pallet cars being for the positive non-slipping transportation of baggage conveyor cars for escalators. On the lower side of the pallet cars, arc-shaped drivers are pivotably mounted about one of the carrying axles constituting a pivot point, by means of a bracket. The drivers are supported on a track via a roller secured at a pivot point on the driver such that during the transportation operation the driver projects through a slot in the pallet car and engages in back of a catch which is secured at the bottom of the baggage conveyor car. Shortly before reaching the horizontal part of the transportation system the driver disengages from the catch of the baggage conveyor car.

10 Claims, 6 Drawing Figures

Figures 1, 2:
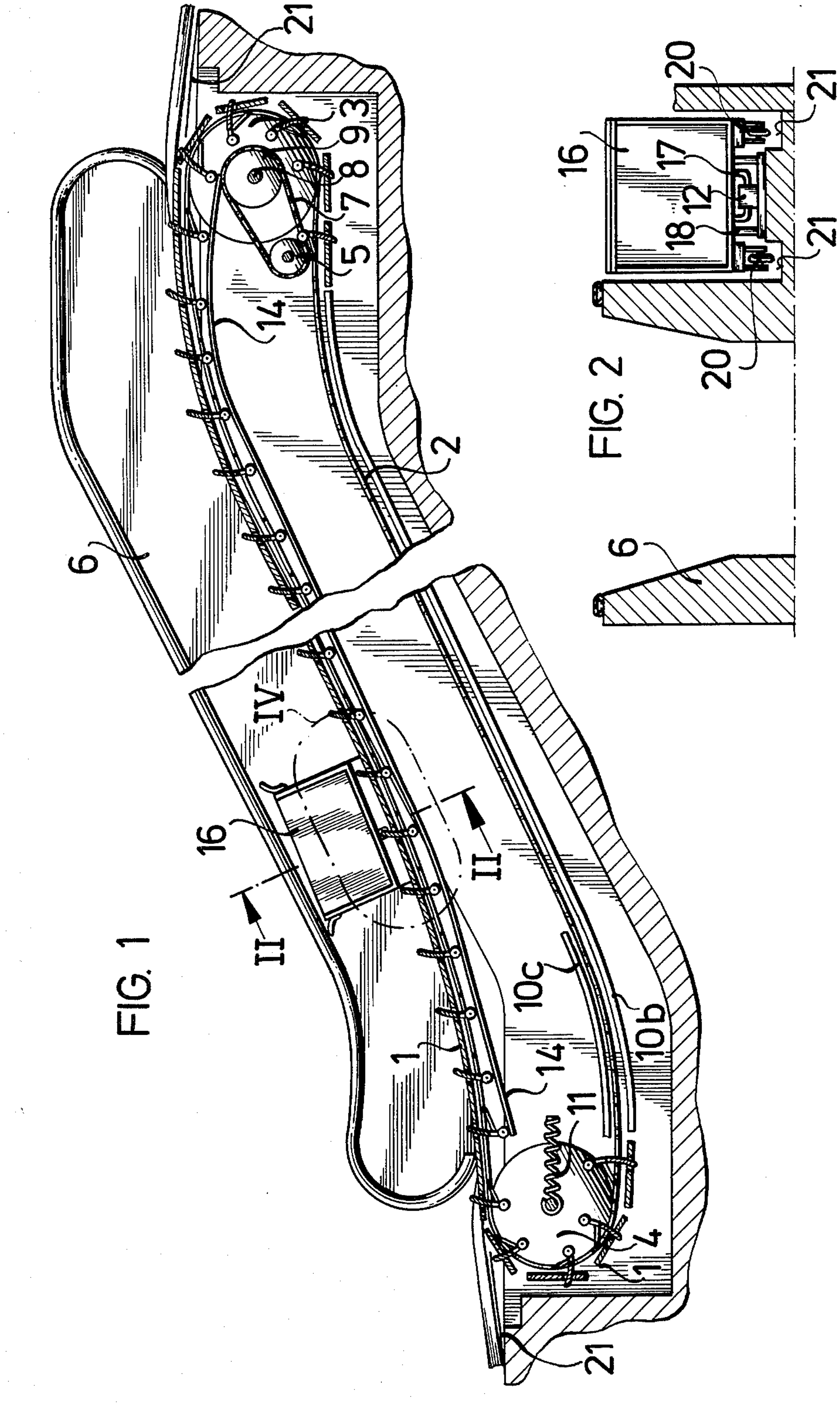

10
14
20
18
1a
1b
13
17
15
12
19
16
V
V
18
20
1
2

TRANSPORTER WITH PALLET CARS COUPLED WITH EACH OTHER FOR ESCALATORS

The invention relates to a transportation or conveyor system with pallet cars coupled with one another, the pallet cars being for the positive non-slipping transportation of baggage conveyor cars for escalators.

On train stations or air fields passengers can transport their travel baggage on available transportation carts or cars. It is also known to lead such type of transportation cars onto escalators. However in this manner safety and security are left to be desired, since during use of the escalator many passengers who do not have baggage to be carried along must apply a certain degree of caution and attention. If however still additional transportation cars are to be carried along, in many cases this causes an unreasonable increase of insecurity. Furthermore the passageway for hurrying, urgent passengers is obstructed and the view of the entrance and exit of the escalator is blocked.

It is a task and object on which the present invention is based to provide a device for the transportation of baggage transportation cars, which makes it possible for the passengers to comfortably transport their baggage without danger during use of the escalators and autowalks (Rollsteigen).

The solution of this task is aided in the manner that on the lower side of the pallet car of the escalator and of the roller autowalk or travelator (Rollsteigen), respectively, there are arranged arcuately shaped drivers which are pivotable about one of the running or carrying axles, the latter constituting a pivot point, by means of a bracket, the drivers being supported on a track by means of a roller secured at a pivot point on the driver such that during the transportation operation the driver projects through a slot of the pallet car and engages behind a catch, the latter being secured at the bottom of the baggage carrier car and before the end of the running path track comes out of engagement from the catch of the baggage conveyor car.

In the construction of the invention the drive of the main shaft of the conveyor or transporter system is brought about by means of a chain from the main shaft of an escalator (and autowalk respectively), the latter being arranged parallel to the transporter system.

In accordance with another feature of the invention the baggage transportation conveyor cars which are provided with the running wheels are provided with standing feet on their lower sides which point to the guide track, by means of which feet the running wheels are unloaded during the transporation in the inclined part of the conveyor or transporter device.

Further particulars and details of the invention may be gathered from the claims and the following description.

The advantage of the arrangement in accordance with the present invention resides in that the passengers also can lead their baggage themselves on escalators or on autowalks or travelators (Rollsteigen) without it being necessary to put up with delays or waiting periods, and without being hindered or obstructed by the baggage.

Figure 3:
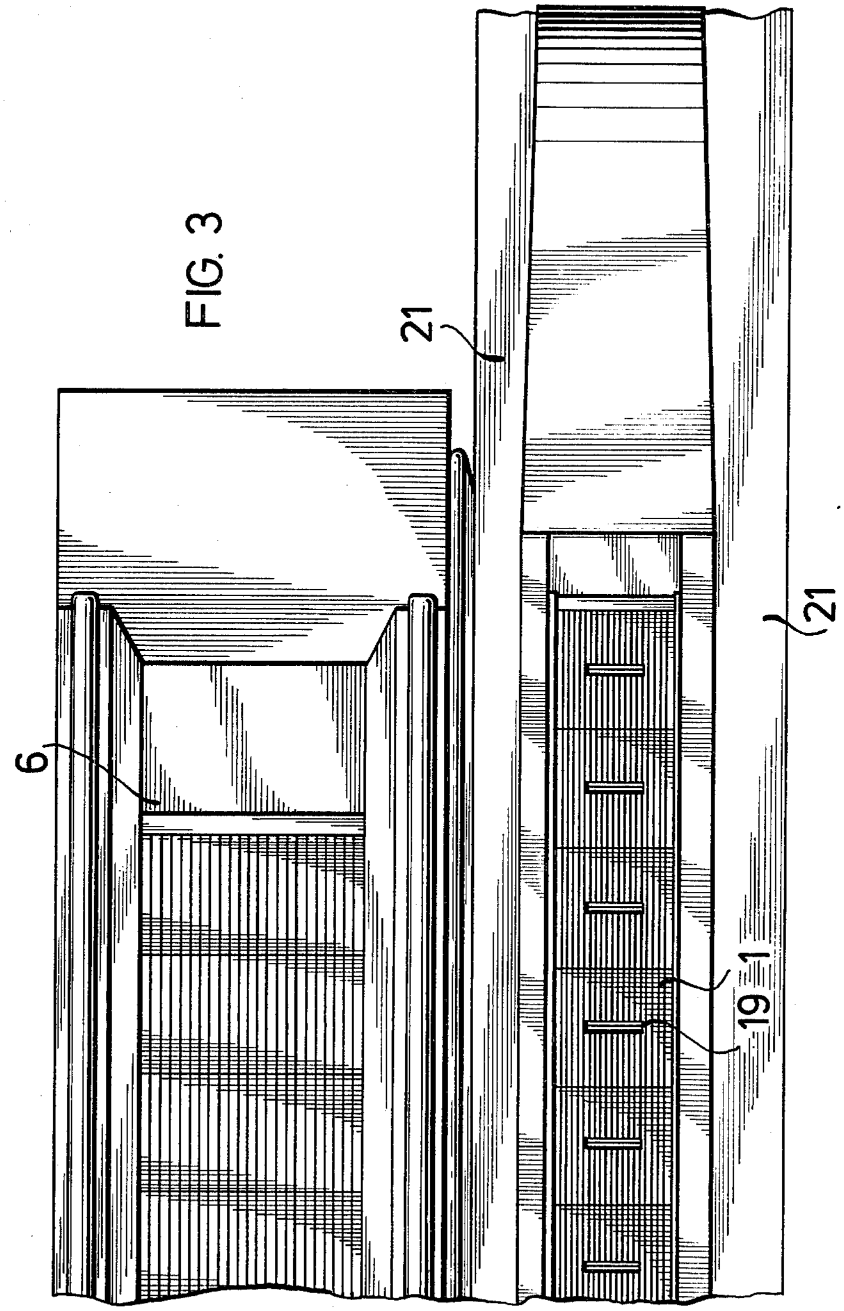
Figure 4:
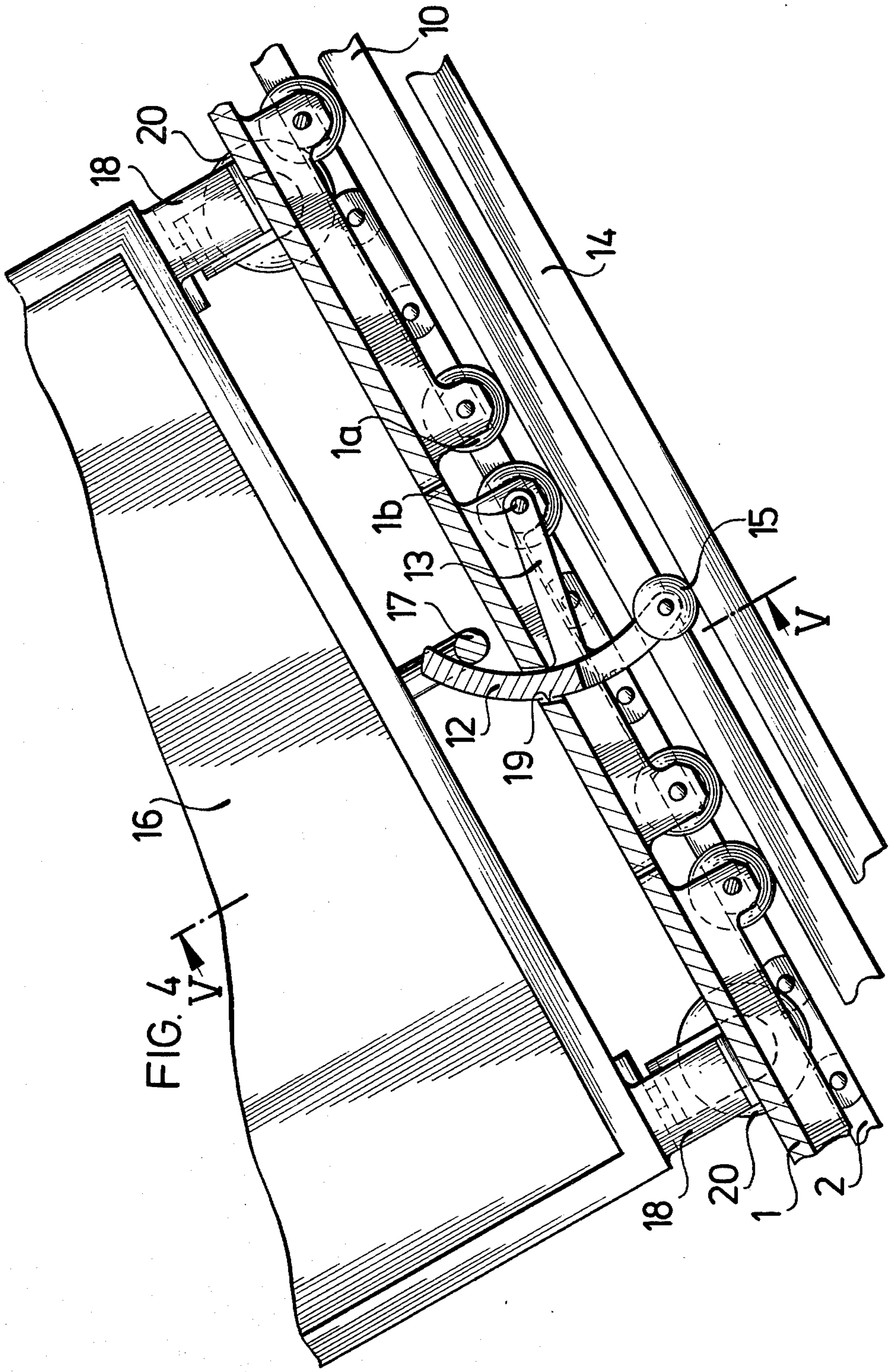
Figure 6:
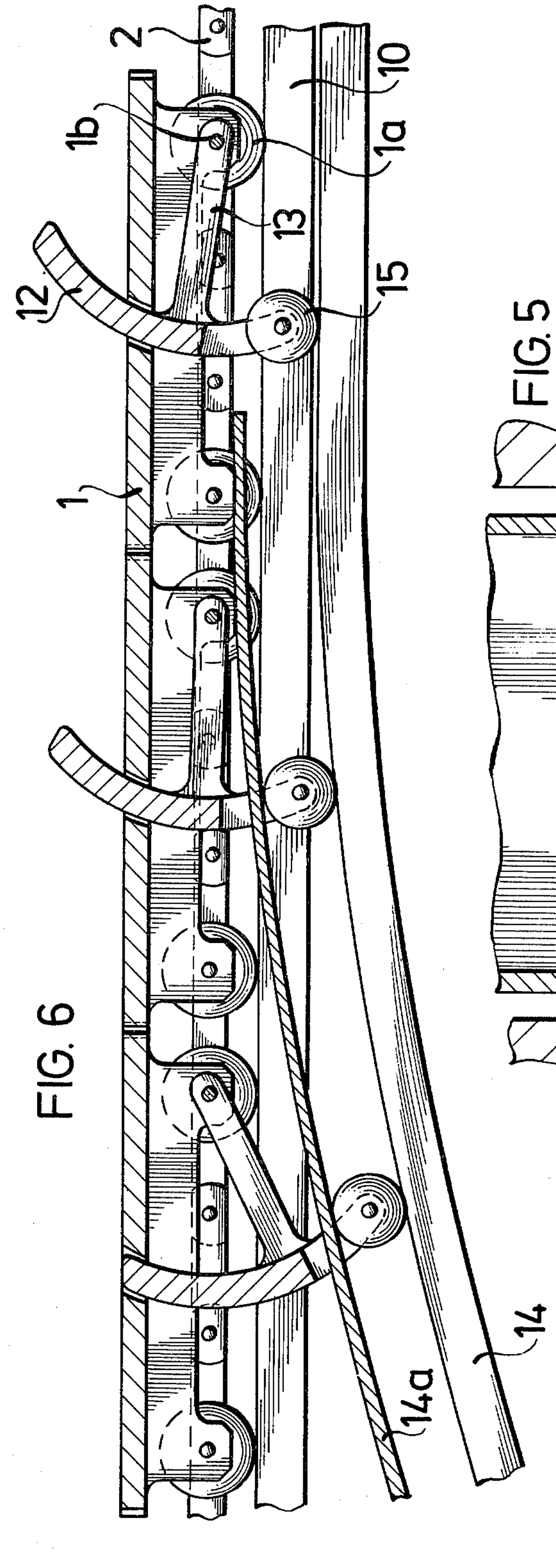
Figure 5:
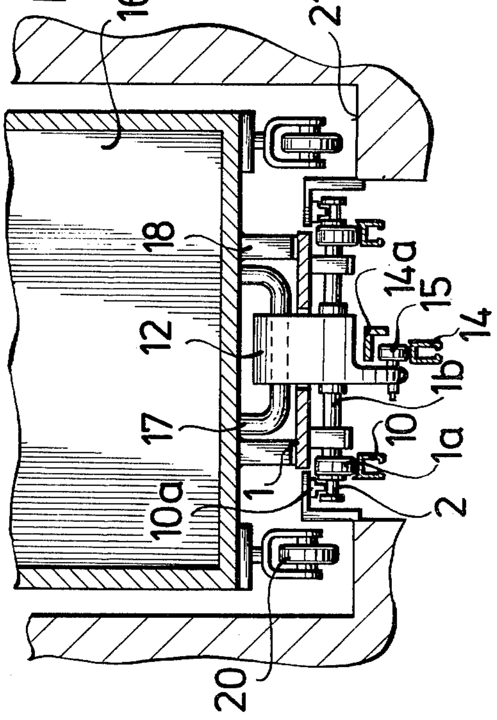

With the above and other objects and advantages in view, the present invention will become more clearly understood in connection with the following detailed description of a preferred embodiment, when considered with the accompanying drawings, of which:

FIG. 1 is a longitudinal section through a baggage car transportation system with a baggage car with a side view of an escalator, FIG. 2 is a view taken along the lines II—II of FIG. 1 and a section through a baggage conveyor car, FIG. 3 is a top plan view of an entrance and exit, respectively, of a baggage car transportation system with escalator entrance arranged parallel thereto, FIG. 4 is a partial section from FIG. 1 (detail IV) with the driver device in enlarged view, FIG. 5 is a section taken along the lines V—V of FIG. 4;

FIG. 6 is a longitudinal section through the conveyor belt of the baggage car conveyor system in the area of the entrance.

The pallet cars 1 are connected with one another into an endless conveyor belt by means a chain 2, which conveyor belt is guided by means of a chain wheel 3 and a reversing wheel 4. The drive of the conveyor belt takes place by means of a chain 7 from the main drive shaft 5 of an escalator, the latter being arranged parallel to the conveyor belt. The chain 7 drives a chain wheel 9, the latter being secured to the main shaft 8 of the chain wheel 3. The conveyor belt which comprises the pallet cars 1 is guided by means of the guide tracks 10, **10*a*, 10*b* and 10*c*. The track rollers 1*a* of the pallet cars 1 operatively run on these guide tracks, the chain 2 running under the guide tracks 10*a* which are secured by means of L-shaped cross-sectional angle members forming limit side walls secured adjacent the tracks 21**.

The running rollers **1*a* are secured on the running or carrying axles 1*b*, the latter being mounted in the pallet cars 1 on the ends thereof at the bottom of the cars. The conveyor belt which is made of the pallet cars 1 is tensioned or stretched by means of a tensioning or stretching device 11. An arcuate shaped driver 12, constituting a section of a cylinder, is rotatably mounted on one of the carrying axles 1*b* of the pallet car 1 by means of a bracket or arm 13, the latter being rigidly connected to the driver 12. On the inner free end of the driver 12, which inner end is step-shaped (FIG. 5) and faces one of the running paths or central track 14 of the transport system, there is rotatably mounted a track roller 15. The roller 15 rolls on the track 14 during the transportation operation of a baggage conveyor car 16. With the other free end of the driver 12 which points to the baggage conveyor car 16, through a slot 19 arranged in a pallet car 1, the driver 12 engages grippingly behind a catch 17, the latter preferably having a U-shape and being secured to and at the bottom of the baggage conveyor car 16, so that the baggage conveyor car 16 is carried along by the conveyor belt, the latter comprising the pallet cars 1. The slot 19 formed in the pallet cars may have a shape conforming to the arcuate shape of the drivers, the latter constituting an arc of a circle with its radius about the corresponding axle 1b to which the bracket 13** is pivoted.

During the transportation operation the baggage conveyor car 16 rests with its front and rear feet 18 thereof on the lateral sides of the pallet cars 1 (FIGS. 4 and 5). At the end of the transportation stretch as a consequence of the descending orientation of the track 14 and the counter guide or counter stay **14*a* thereabove, the driver 12 slides backwards in the slot 19 such that the driver 12 forms a plane with the upper surface of the pallet wagon 1 (note the position of the left hand driver in FIG. 6), whereby the catch 17 is released, so that after the completed transportation operation, the baggage car 16 can roll further with its lateral front and rear running wheels 20 on the lateral running paths or tracks 21 of the system for the baggage car 16. The standing feet 18 of the baggage carrier car 16 are formed shorter than the wheels 20***a* so that when the carrier cars 16 are off the conveyor system they can be rolled on the ground. During engagement with the pallet cars in the conveying operation, the feet 18 abut the top of the pallet cars and the wheels 20 are lifted off the tracks 21 and are unloaded.

The invention is not limited to the illustrated embodiment examples. The baggage car conveyor system can also find use with self-propelled or self-driven machines next to moving stairs or escalators parallel to the course of the traveling stairs or escalators. Likewise the driving out or driving of the drivers over a baggage conveyor car can be released or rendered operative by a photocell control and the like. With a baggage car conveyor system integrated with an escalator, the main drive shaft of the escalator and the main shaft of the transportation or conveyor belt can be flushly and directly coupled with one another.

While I have disclosed several embodiments of the present invention it is to be understood that these embodiments are given by example only and not in a limiting sense.

I claim:

1. A transporter system for positive non-slipping support and transport of baggage conveyor cars between ends of the transporter system, comprising a plurality of pallet cars operatively connected to one another forming an endless, moveable conveyor belt, each of said pallet cars being formed with a slot therethrough and having a lower side, carrying axles mounted on the lower side of each of said pallet cars, an arc-shaped driver being pivotable about one of said carrying axles, said carrying axles constituting a pivot point, on the lower side of each of said pallet cars, a portion of said driver extending slidably into said slot, bracket means for pivotably mounting said driver on said one carrying axle on each of said pallet cars, a roller rotatably secured at a point on said driver opposite said portion extending into said slot, track means for supporting said rollers moveably thereon and thereby supporting said drivers, said track means, along an intermediate transportation path between the ends of the transporter system, cooperating with said rollers during a transportation operation of a baggage conveyor car in said intermediate transportation path so as to support said driver projecting through said slot of said pallet car extending thereabove so as to engage behind a catch secured at a bottom of the baggage conveyor car, and means for disengaging said driver from the catch of the baggage conveyor car shortly before reaching the ends of the transporter system.

2. The transporter system as set forth in claim 1, further comprising an escalator oriented parallel to said conveyor belt, said escalator having a main shaft, main shaft means for driving said conveyor belt, and chain means for driving said main shaft means from said main shaft of said escalator.

3. The transporter system as set forth in claim 1, further comprising a baggage conveyor car having running wheels and standing feet means on a lower side thereof, said standing feet means ending higher than said running wheels, said pallet car is smaller than the spacing of said running wheels so that the latter overlap said pallet car, said standing feet means for supporting said baggage conveyor car on said pallet car during the transportation operation, running rollers rotatably mounted on said carrying axles, guide track means facing toward the lower side of said baggage conveyor car, said guide track means for guiding said running rollers thereon, running tracks disposed under said running wheels, said standing feet means are disposed relative to said running wheels, said guide track means, said running rollers, said carrying axles and said pallet cars, for unloading said running wheels so that the running wheels are spaced above said running tracks during the transporation operation in the inclined transportation path of the transporter system.

4. The transporter system as set forth in claim 3, wherein the catch of said baggage conveyor car is a U-shaped catch having ends connected to a central portion of the lower side of said baggage conveyor car, said driver engages forklike inside of said U-shaped catch in the inclined transportation path, said guide track means constitute a pair of track means, said running tracks constitute a pair of running tracks laterally disposed relative to said guide track means, and said first-mentioned track means is centrally and inwardly disposed to said guide track means.

5. The transporter system as set forth in claim 1, wherein said slot forms an arc having a radius about said one carrying axle.

6. A transporter system for positive nonslipping support and transport of baggage conveyor cars between horizontal exit and entrance ends of the transporter system comprising a plurality of pallet cars operatively connected to one another forming an endless moveable conveyor belt, each of said pallet cars being formed with a slot therethrough and having a lower side, carrying axles mounted on the lower side of each of said pallet cars, an arc-shaped driver being pivotable about one of said carrying axles, said carrying axles each constituting a pivot point, on the lower side of each of said pallet cars, a portion of said driver extending slidably into said slot, bracket means for pivotably mounting said driver on said one carrying axle on each of said pallet cars, a baggage conveyor car including a catch secured at a bottom thereof, said baggage conveyor car having standing feet adapted to be simply placed on said pallet car unconnected therewith, control means for automatically engaging said driver, during transportation operation with said feet remaining on said pallet car, with said catch so as to secure said baggage conveyor car to said pallet car between the exit and entrance ends of the transporter system, and respectively for releasing the securing adjacent the exit and entrance ends of the transporter system, a roller rotatably secured at a point on said driver opposite to said portion extending into said slot, track means for supporting said roller of said drivers moveably thereon and thereby supporting said drivers, said track means having an intermediate transportation path and track ends thereof adjacent the horizontal exit and entrance ends of the transporter system, said track means being oriented along the intermediate transportation path such that during the transportation operation of said baggage conveyor car disposed on said pallet car in said intermediate transportation path said driver projects through said slot of said pallet car extending thereabove and engaging behind said catch secured at the bottom of the baggage conveyor car, and means for automatically disengaging said driver from the catch of the baggage conveyor car alone substantially upon reaching the horizontal exit and entrance ends of the transporter system.

7. The transporter system as set forth in claim 6, wherein said horizontal exit and entrance ends of the transporter system are disposed at different levels, said intermediate transportation path is inclined and spaced from said pallet car supporting said driver thereon such that an upper end of said driver engages said catch.

8. The transporter system as set forth in claim 6, wherein said disengaging means includes a portion of said track means oriented at said track ends spaced further apart from said pallet cars than the spacing of said intermediate transportation path from said pallet cars such that thereat said driver is retracted into said slot in said pallet car substantially level therewith disengaging from said catch of said baggage conveyor car.

9. The transporter system as set forth in claim 6, further comprising endless chain means for connecting ends of said carrying axles and forming with said pallet cars said endless, moveable conveyor belt.

10. The transporter system as set forth in claim 6, wherein said pallet cars have a completely planar support surface on which said standing feet stand.

* * * * *